United States Patent Office 3,356,721
Patented Dec. 5, 1967

3,356,721
CITRIC ACID MANUFACTURE
Richard H. Wiley, Louisville, Ky.
(30 Beekman Place, New York, N.Y. 10017)
No Drawing. Filed Mar. 21, 1962, Ser. No. 181,466
8 Claims. (Cl. 260—535)

This invention describes a process for the manufacture of citric acid. More particularly, this invention relates to a catalytic chemical process for the manufacture of citric acid which uses as starting materials inexpensive petrochemicals and avoids costly fermentation processes.

It is well known that citric acid is produced by fermentation processes and that much effort has been devoted to devicing economies in this process. Various types of microorganisms have been used and much effort has been devoted to selecting a strain of these microorganisms which is most effective in producing high yields of citric acid. Radiation-induced and chemical-induced mutant strains have been investigated to produce artificially such high yield strains. Also, much effort has been directed to utilizing inexpensive sources of carbon in place of the expensive carbohydrates which the organisms prefer, and to the development of refined deep broth culture techniques to reduce the cost of manufacture. There is a limit in all of these approaches, however, because fermentation processes are inherently expensive to operate. A non-reducible minimum time, which therefore establishes a minimum capital investment in fermenters, is required for the organism to grow. It is, therefore, highly desirable to have a method of manufacture based on a chemical process which avoids the inherent limitations in rates and raw material costs of fermentation processes. In spite of these economic incentives no feasible process for the commercial preparation of citric acid from petrochemicals has yet been achieved. It is the objective of this invention to describe such processes.

It is also to be noted that the several "syntheses" of citric acid which have been described, such as those from dichloroacetone, calcium glycollate, and ethyl bromoacetate, make use of expensive electrochemical reagents (chlorine, bromine, or sodium), or non-petrochemical condensation reagents (not catalysts) such as zinc or sodium alkoxides, or expensive process conditions such as ultraviolet light irradiation. These are non-economic laboratory curiosity syntheses of no practical value and are not to be confused with the economically feasible chemical processes which are disclosed herein.

The present invention describes a chemical process for the manufacture of citric acid which utilizes catalytic processes and petrochemicals, thus avoiding costly fermentation processes and electrochemical reagents and intermediates.

According to my invention, citric acid is produced in a two-step process starting from a 2-butene-1,4-dioic acid compound. In the first step of my process the 2-butene-1,4-dioic acid compound is oxidized by air or oxygen in the presence of a catalyst to form the corresponding 2-hydroxy-2-butene-1,4-dioic acid compound. For example, using maleic anhydride, or maleic or fumaric acid, salt or dialkyl ester, the following reactions occur:

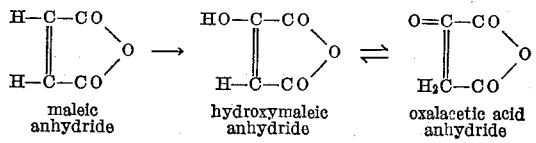

maleic anhydride → hydroxymaleic anhydride ⇌ oxalacetic acid anhydride

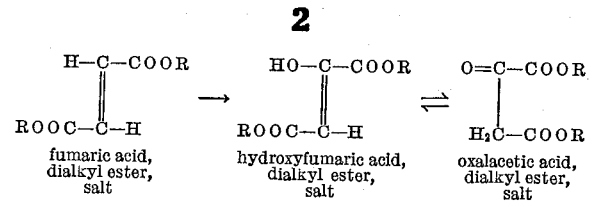

fumaric acid, dialkyl ester, salt → hydroxyfumaric acid, dialkyl ester, salt ⇌ oxalacetic acid, dialkyl ester, salt wherein R stands for hydrogan, alkyl or a metal.

The air or oxygen catalyzed oxidation of the 2-butene-1,4-dioic acid compound is possible with a palladium salt catalyst. The reaction takes place in the liquid, solid or vapor state. In the presence of the air or oxygen required for the oxidation, however, the palladium may be converted to a form which is not a catalyst for the oxidation. It is also possible to conduct the oxidation using equivalent or catalytic quantities of palladium chloride and the 2-butene-1,4 dioic acid compound, separating the palladium from the products, reactivating or isolating the palladium salt for subsequent use in a separate step, and isolating or reacting the keto-enol product. This is a suitable procedure and very useful in aiding separation of products and for economical operation. To economize on the utilization of palladium the regeneration is also done in situ by adding a cuprous or other salt which is reduced in this oxidation and reoxidized by air for further reaction. Other salts which are useful in this reaction are those of Group I–B of the Periodic Chart of the Elements, and Groups VI–B and VII–B, such as manganese, chromium and molybdenum.

It is a peculiar advantage of this process that oxidation of the 2-butene-1,4-dioic compound also takes place in the presence of concentrated hydrochloric acid without the precipitation of palladium, and without the necessity of added regenerating metal salt. This enables one to operate the oxidation continuously without a complicating reoxidation of the reduced or precipitated palladium that might otherwise form, thus permitting catalyst economies. Presumably, under these conditions the process involves complexes of palladium ions with the olefinic bond and oxygen in electron transfer processes which do not precipitate reduced or metallic palladium. This makes possible truly catalytic and continuous processes in which the 2-butene-1,4-dioic compound is diffused with air in a suitable mixing vessel over an insolubilized palladium salt on a typical catalyst support. It also makes possible the use of liquid-liquid or liquid-solid processes in which the reactant can be separated continuously after the reactants are mixed with air in counter-current processes.

The quantities of each material required in this type of oxidation are not critical. Catalytic quantities of palladium salt will vary from 0.01 to 10 percent of the weight of the 2-butene-1,4-dioic compound oxidized. The amount of air can be in excess of that needed on an equimolar basis. It is desirably used in large excess to agitate the reaction ingredients in some modes of operation, and in other modes of operation is used in no more than equimolar quantities to avoid solvent loss or precipitation through evaporation. The process is one which operates satisfactorily at room temperature (20–25° C.), but can also be operated at lower temperatures (10–20° C.) in order to avoid solvent loss and control side-reactions, or at higher temperatures (25–70° C.) in order to enhance solubility and prevent precipitation of reactants and products, and to accelerate the reaction. The recovery of the product may be by any suitable method such as by fractional crystallization, distillation, sublimation, ion exchange absorption and elution, electrodialysis, osmotic diffusion, or partition chromatography, or by hydrolysis or alcoholysis to a product. The palladium salt catalyst can be recovered from the reaction product by ion exchange absorption, or by precipitation with ethylene or carbon monoxide as metallic palladium.

In the second step of my process, ketene is condensed with oxalacetic acid, or the anhydride, salt or dialkyl ester thereof, in the presence of a suitable condensation catalyst at lower temperatures to form an intermediate β-lactone compound, which is then hydrolyzed to give citric acid.

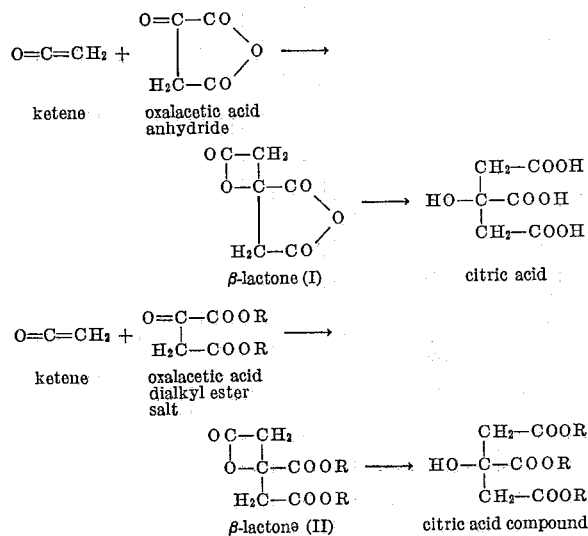

wherein R stands for hydrogen, alkyl or a metal;
β-lactone (I) is named 1,6-dioxaspiro [3,4]octane-2,5,7-trione, and
β-lactone (II) is named 4-carbalkoxy-4-carbalkoxy-methyl-2-oxetanone.

Although several modifications of this process are possible, the preferred processes involve the reaction of ketene with either oxalacetic anhydride, as such, or formed in situ by reaction of ketene with oxalacetic acid, to give 1,6-dioxaspiro[3,4]octane-2,5,7-trione (I), or with a dialkyl oxalacetate to give 4-carbalkoxy-4-carbalkoxymethyl-2-oxetanone (II), both of which are hydrolyzable to citric acid, as shown in the above reactions. Compound (II) is partially hydrolyzable to asymmetrical dialkyl citrate, and can be alcoholyzed.

The oxalacetic acid derivatives used as starting materials for Step II of my invention are available commercially, or can be made as Step I in the over-all process by air oxidation of maleic anhydride, or by the air oxidation of the esters or salts or maleic or fumaric acids as shown above.

The formation of the β-lactone intermediates in the second step of my process takes place with ketene using a suitable condensation catalyst. This is important to avoid other unwanted ketene reaction, such as enol acetate formation, which would otherwise take place. Preferred condensation catalysts are the zinc chloride-acetic acid complex, and boron fluoride etherate. Other catalysts which are suitable for this reaction include boron fluoride, zinc chloride, zinc fluoborate, zinc thiocyanate, magnesium perchlorate, ferric fluoborate, stannic fluoborate, boric acid, triacetyl borate, and mercuric chloride; also, the solid activated alumina catalysts of the silica-alumina type (Al$_2$O$_3$/SiO$_2$) activated with thorium, zirconium or boron, as described in U.S.P. 2,462,357.

The amount of catalyst employed is equivalent to about 0.2% to 5.0% of the metal ion based on the weight of the oxalacetic acid compound used as starting material.

The condensation reaction is preferably carried out at a temperature within the range of 0°–10° C., but is operative from —20 to +60° C. At high temperatures substituted β-hydroxypropionic acid derivatives are the products.

The β-lactone intermediate may be isolated by any suitable method, for example, by short path vacuum distillation, low temperature distillation, or by low temperature fractional crystallization. It is an advantage of my invention that the intermediates need not be isolated. In fact, the best over-all yields of citric acid are obtained if the intermediates are not isolated. If isolated, however, they can be converted directly to useful derivatives of citric acid, such as esters and acetates. The intermediate compounds are also useful as plasticizers and blowing agents; they can also be converted to foamed plastics.

Hydrolysis of the β-lactone intermediate gives, if complete, citric acid; if incomplete, carboxyanhydrides or partial esters of citric acid. If the β-lactones are alcoholyzed, O-alkyl-trialkyl citrates are obtained.

It is an advantage of my invention that such esters or partial esters may be prepared directly from the β-lactone intermediate, rather than in a two-step process by hydrolysis of the β-lactone to citric acid and then esterification of the citric acid formed.

The citric acid which is obtained on the hydrolysis of the β-lactone intermediate can be isolated by any known method, for example, as the calcium salt, followed by regeneration of the citric acid with sulfuric acid, or by cooling and concentrating the hydrolyzate.

The following examples illustrate methods of carrying out the present invention but it is to be understood that these examples are given for purposes of illustration and not of limitation.

In these examples all parts are parts by weight unless otherwise indicated. The cupric chloride-palladium chloride catalyst is prepared by dissolving equal parts by weight of the two salts. The catalyst designated as a zinc chloride-acetic acid complex is prepared by dissolving anhydrous zinc chloride in glacial acetic acid. The boron trifluoride etherate is the commercially available BF$_3$·C$_2$H$_5$OC$_2$H$_5$. The activated alumina catalysts are prepared as described in U.S.P. 2,462,357.

*Example 1*

Dimethyl fumarate (10 parts) is blown with air for one to five hours in the presence of cupric chloride-palladium chloride catalyst (0.1 part) until a maximum concentration of dimethyloxalacetate is obtained as is determined by spectrophotometric analysis of the mixture. The presence of the product can be demonstrated by precipitation of the 2,4-dinitrophenyl-hydrazone, M.P. 110° dec. The catalyst is separated by filtration and ion exchange treatment.

The resulting product, which contains the dimethyl-oxalacetate, is treated with zinc chloride-acetic acid complex (0.5 part) and an amount of ketene, generated from diketene, equivalent to the amount of dimethyloxalacetate present. This amount varies from 40% to 95%. The mixture is held at 0° to 10° C. for one hour to complete the reaction.

Sufficient lime-water is added to hydrolyze the β-lactone intermediate (4-carbomethoxy-4-carbomethoxymethyl-2-oxetanone) to citric acid, and to neutralize the citric acid formed. The mixture is heated gently to precipitate the calcium citrate. The calcium citrate is converted to citric acid by treatment with sulfuric acid.

If desired, the β-lactone intermeriate may be isolated prior to hydrolysis by short path high vacuum distillation, low temperature distillation, or by low temperature fractional crystallization. The 4-carbomethoxy-4-carbomethoxymethyl-2-oxetanone heated to about 40° to 60° C. gives a polymeric product which is converted on heating to dimethyl aconitate and dimethyl itaconate. The same products are obtained if the crude reaction mixture containing the 4-carbomethoxy-4-carbomethoxymethyl-2-oxetanone is heated to 40° to 60° C., or if the reaction in which the oxetanone is formed is carried out at 40° to 60° C. instead of at 0° to 10° C.

*Example 2*

An ether solution of diethyl oxalacetate containing 16 g. of the ester is obtained by ether extraction of an aqueous solution of sodium oxalacetate neutralized with dilute sulfuric acid. Boron trifluoride etherate is added to the ether solution in an amount equivalent to about 0.2–0.5% by weight (0.1 g.) of the fluoride. Then ketene, generated from diketene, is passed into the mixture in an equimolar amount (4.2 g.) calculated on the basis of the amount of diethyl oxalacetate present in the solution. The reaction mixture is maintained at 0° to 10° C. during the addition of the ketene, and for about one hour longer to complete the reaction. The ether is distilled off carefully at low temperatures to give a residue which is solidified at low temperatures to give substantially pure 4-carbethoxy-4-carbethoxymethyl-2-oxetanone.

The 4-carbethoxy-4-carbethoxymethyl-2-oxetanone on treatment with cold water and then with an equivalent amount of calcium hydroxide, at first cold and then warm, but not over 60° C., precipitates calcium citrate. The calcium citrate is converted into citric acid by treatment with sulfuric acid.

The 4-carbethoxy-4-carbethoxymethyl-2-oxetanone on controlled reaction with one equivalent of cold water is converted to asymmetrical diethyl citrate (Ag salt, M.P. 110° C.) which is isolated as a syrup. The diethyl citrate may be further converted to its acetyl derivative, to citric acid, or to trimethyl citrate. Alcoholysis of diethyl citrate with ethanol gives the O-ethyltriethyl citrate.

The 4-carbethoxy-4-carbethoxymethyl-2-oxetanone on heating loses carbon dioxide to give a residue from which diethyl itaconate is obtained on fractionation. Heating the crude oxetanone with a trace of benzoyl peroxide initiator gives a foamed polymer of diethyl itaconate.

The reaction of ketene with diethyl oxalacetate as described above, except that the reaction is carried out at 40°–60° C. instead of 0°–10° C. gives on removal of the solvent, a low molecular weight polyester. Depolymerization of this product by heating under vacuum affords diethyl itaconate. Alcoholysis with ethanol gives triethyl itaconate.

*Example 3*

Hydroxymaleic anhydride (11.5 g.) is treated with 0.1 ml. of boron fluoride etherate (0.2–0.5% by weight of metal ion) and ketene (4.0 g.), with or without the addition of ether (20 parts) as solvent. The residual or precipitated β-lactone intermediate, 1,6-dioxaspiro[3,4]octane-3,5,7-trione, is separated. This is treated with cold water and then warmed gently to about 25° C. On cooling and concentrating this solution, the citric acid precipitates.

The citric acid may also be recovered by treating the crude reaction product with lime-water to precipitate the citric acid as calcium citrate, and then reconverting the calcium citrate to citric acid, using sulfuric acid.

On treating the crude reaction product with ethyl alcohol, O-ethyl triethyl citrate is formed.

Heating the crude reaction product containing the β-lactone intermediate gives itaconic anhydride, or a polymer thereof.

The hydroxymaleic anhydride used as starting material in the above synthesis may be preformed by known means, or generated in situ by the air oxidation of maleic anhydride. In the latter reaction 10 parts of maleic acid is blown with air for one to five hours in the presence of 0.1 part of cupric chloride-palladium chloride catalyst. The catalyst is then separated and the resulting solution of hydroxymaleic anhydride is used for the synthesis.

*Example 4*

Hydroxymaleic anhydride (11.4 parts), M.P. 81–2° C., prepared by reacting diacetyl tartaric anhydride with pyridine at −5° C., is dissolved in ether (80 parts), and 1.0% by weight of boron trifluoride etherate is added. An equimolar amount of ketene, generated from diketene, is passed into this solution while maintaining the temperature at 0° to 5° C. The solvent is removed in vacuo leaving a syrupy residue of the β-lactone intermediate (1,6-dioxaspiro[3,4]octane-2,5,7-trione). This residue is recrystallized at low temperatures.

The β-lactone compound reacts with an equivalent amount of cold water to give citric acid; with an equivalent amount of ethanol to give O-ethyl triethyl citrate; or by heating to give itaconic anhydride. Heating to about 80–100° C. with 0.5% by weight of benzoyl peroxide catalyst gives a foamed polymer of itaconic anhydride.

*Example 5*

Diethyl fumarate (10 parts) and palladium chloride (10 parts) in concentrated hydrochloric acid (15 parts) are blown with air for about 5 hours (until nearly all of the palladium has dissolved). Acetone (20 parts) may be used as a solvent. The solution is then treated with an ion exchange resin to remove the palladium.

*Example 6*

A solution of 17.0 g. of diethyl oxalacetate, prepared by the palladium chloride catalyzed oxidation of diethyl fumarate, or from the commercial sodium salt, is dissolved in 10 ml. of ether and 0.5 g. of alumina-silicaboron oxide catalyst, prepared as described in U.S. Patent 2,462,357, is added. The suspension is stirred at 20–25° while ketene, generated from diketene, is passed in until one molecular equivalent (4.2 g.) has been absorbed. The catalyst is filtered off and the solvent evaporated to leave essentially pure β-lactone (II, R=$C_2H_5$) as a semi-solid. This product is identified by hydrolysis to citric acid.

Following the same procedure, but using 13.0 g. of oxalacetic acid suspended in ether and 9.0 g. of ketene, the β-lactone (I) is obtained essentially pure after thorough evacuation to remove acetic acid. The lactone is identified by hydrolysis to citric acid, M.P. 98–100° C.

*Example 7*

Fumaric acid (0.2 g.) is suspended in a mixture of 5 ml. of concentrated hydrochloric acid containing 0.1 g. of palladium chloride. Air is passed through the mixture for 15 minutes. A test of an aliquot portion of the solution with 2,4-dinitrophenylhydrazine reagent is positive and the precipitate on isolation melts at 170° C. with decomposition (160–180° dependent on the rate of heating) as does also the 2,4-dinitrophenylhydrazine derivative of oxalacetic acid formed from an authentic sample (Biochem. Prep. vol. 3, p. 59).

Using diethyl fumarate in place of fumaric acid, the derivative similarly obtained melts at 110° C. as does also the derivative prepared from an authentic sample of diethyl oxalacetate.

Continuing the aeration of the fumaric acid reaction for five hours and precipitating the insoluble dinitrophenylhydrazine derivative from the filtered reaction mixture gives 0.1 g. of the derivative. Alternatively, the pure oxalacetic acid is obtained by decationization of the reaction mixture with an ion exchange resin followed by evaporation and recrystallization from ethyl acetate, M.P. 150.2° C.

*Example 8*

A solution of maleic anhydride (10 g.) in benzene (1 liter) is allowed to flow downward over a supported palladium catalyst in the presence of a rising stream of air over a four hour period. The catalyst is prepared by converting a cation exchange resin (dowex 50–8X which is a sulfonated styrene resin sold by the Dow Chemical Corporation) to the palladium salt form by exchange with palladium chloride solution, or by depositing palladium chloride (or sulfate) on or in a metal oxide (alumina-silica, alumina-zirconia or alumina-titania). The air flow is regulated so as to avoid loss of benzene, or precipitation of maleic anhydride by evaporation of the benzene (10–100 ml. per min.). About 200 ml. of supported catalyst is used in vertical 20 x 500 mm. tube. The effluent benzene solution is treated with boron fluoride etherate (.5 ml.) and ketene in equimolar amount (4.2 g.). Evaporation leaves the β-lactone (I) which on hydrolysis is converted to citric acid. The depalladinized solution is distilled under high vacuum to separate the solvent (if used), the reactant, and the diethyl oxalacetate which is obtained as a product.

In accordance with the above procedure, but using fumaric acid or maleic anhydride in place of diethyl fumarate, the corresponding oxalacetic acid compound is obtained as a product.

Various changes and modifications may be made in carrying out teh present invention without departing from the spirit and scope thereof. Insofar as these changes and modifications are within the purview of the annexed claims, they are to be considered as part of my invention.

I claim:
1. A process for the preparation of citric acid which comprises the steps of
   (a) oxidizing maleic acid, di(lower alkyl) ester or anhydride, or fumaric acid or di(lower alkyl) ester, with air or oxygen in the presence of a palladium salt at a temperature within the range of 10° and 70° C. to form the corresponding oxalacetic acid, di(lower alkyl) ester, or anhydride;
   (b) condensing said oxalacetic acid, di(lower alkyl) ester, or anhydride with ketene in the presence of a zinc chloride-acetic acid catalyst, a boron trifluoride etherate catalyst, or an alumina-silica-boron oxide catalyst, at a temperature within the range of −20 and +60° C., to form a β-lactone compound having structural Formula A when the starting compound is an acid or ester; or Formula B when the starting compound is an anhydride:

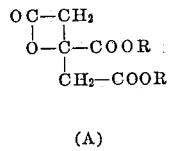
(A)

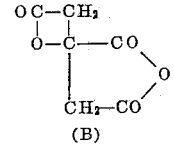
(B)

where R in Formula A represents hydrogen or lower alkyl; and
   (c) hydrolysis of said β-lactone to citric acid at a temperature up to and including 60° C., by treating compound of Formula A with lime water to produce calcium citrate, followed by treatment of said calcium citrate with sulfuric acid; or by treating the compound of Formula B with water alone.

2. The process of claim 1 wherein the starting material is maleic anhydride.
3. The process of claim 1 wherein the starting material is a di(lower alkyl) fumarate.
4. The process of claim 1 wherein the starting material is fumaric acid.
5. The process of claim 1 wherein the catalyst in Step (a) is palladium chloride regenerated in situ with cupric chloride.
6. The process of claim 1 wherein a boron trifluoride etherate catalyst is employed in Step (b).
7. The process of claim 1 wherein a zinc chloride-acetic acid catalyst is employed in Step (b).
8. A process for the preparation of citric acid which comprises condensing oxalacetic acid, or a di(lower alkyl) ester thereof, with ketene in the presence of a zinc chloride-acetic acid catalyst, boron trifluoride etherate catalyst, or an alumina-silica-boron oxide catalyst, at a temperature within the range of −20 and +60° C., to form a compound having the following structural formula:

$$\begin{array}{c} \text{OC—CH}_2 \\ | \quad | \\ \text{O—C—COOR} \\ | \\ \text{CH}_2\text{COOR} \end{array}$$

where R is hydrogen or lower alkyl, and treating the above compound with lime water at a temperature up to and including 60° C. to produce calcium citrate, followed by treatment of said calcium citrate with sulfuric acid to produce citric acid.

References Cited

UNITED STATES PATENTS

| | | | |
|---|---|---|---|
| 2,450,117 | 9/1948 | Caldwell | 260—343.9 |
| 2,739,158 | 3/1956 | Caldwell | 260—343.9 |
| 2,759,003 | 8/1956 | Jansen et al. | 260—343.9 |
| 2,911,380 | 11/1959 | Doedens | 260—2.5 |
| 2,966,471 | 12/1960 | Anspon | 260—2.5 |
| 2,998,446 | 8/1961 | Montagna | 260—484 |
| 3,028,417 | 4/1962 | Eisenmann | 260—484 |

OTHER REFERENCES

Beilstein: Handbuck der Organischen Chemie, vol. III, Erstes Erganzungwerk (1959), page 197.

JAMES A. PATTEN, *Primary Examiner.*

L. J. BERCOVITZ, M. FOELAK, *Assistant Examiners.*